US012683446B2

(12) United States Patent
Fukushima

(10) Patent No.: US 12,683,446 B2
(45) Date of Patent: Jul. 14, 2026

(54) ROTOR AND MOTOR

(71) Applicant: Fanuc Corporation, Yamanashi (JP)

(72) Inventor: Yuusuke Fukushima, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 184 days.

(21) Appl. No.: 18/692,439

(22) PCT Filed: Sep. 30, 2021

(86) PCT No.: PCT/JP2021/036211
§ 371 (c)(1),
(2) Date: Mar. 15, 2024

(87) PCT Pub. No.: WO2023/053371
PCT Pub. Date: Apr. 6, 2023

(65) Prior Publication Data
US 2024/0405624 A1 Dec. 5, 2024

(51) Int. Cl.
*H02K 1/27* (2022.01)
*H02K 1/276* (2022.01)
*H02K 1/28* (2006.01)

(52) U.S. Cl.
CPC .............. *H02K 1/28* (2013.01); *H02K 1/276* (2013.01)

(58) Field of Classification Search
CPC ................................. H02K 1/28; H02K 1/276
See application file for complete search history.

(56) References Cited

U.S. PATENT DOCUMENTS

| | | | |
|---|---|---|---|
| 2007/0126304 A1 | 6/2007 | Ito et al. | |
| 2012/0274169 A1 | 11/2012 | Saito et al. | |
| 2018/0248428 A1* | 8/2018 | Nigo ....................... H01F 1/057 |

FOREIGN PATENT DOCUMENTS

| | | | |
|---|---|---|---|
| JP | H1198731 A | | 4/1999 |
| JP | 2001061261 A | | 3/2001 |
| JP | 2007159196 A | | 6/2007 |
| JP | 2007181254 A | | 7/2007 |
| JP | 2009171775 A | * | 7/2009 |
| JP | 2011083126 A | | 4/2011 |
| JP | 2011101504 A | | 5/2011 |
| JP | 2020114109 A | | 7/2020 |

OTHER PUBLICATIONS

International Search Report (PCT/ISA/210) with translation and Written Opinion (PCT/ISA/237) mailed on Nov. 9, 2021, by the Japan Patent Office as the International Searching Authority for International Application No. PCT/JP2021/036211. (10 pages).

* cited by examiner

*Primary Examiner* — Thomas Truong
(74) *Attorney, Agent, or Firm* — BUCHANAN INGERSOLL & ROONEY PC

(57) ABSTRACT

A rotor includes a rotor core; a plurality of magnets respectively inserted in a plurality of first through-holes formed in the rotor core; and a plurality of rods respectively inserted in a plurality of second through-holes formed in the rotor core. A first gap between each of the first through-holes and the corresponding magnet is larger than a second gap between each of the second through-holes and the corresponding rod.

5 Claims, 8 Drawing Sheets

ROTOR AND MOTOR

CROSS REFERENCE TO RELATED APPLICATIONS

This is the U.S. National Phase application of PCT/JP2021/036211, filed Sep. 30, 2021, the disclosures of this application being incorporated herein by reference in their entireties for all purposes.

FIELD OF THE INVENTION

The present invention relates to a rotor and a motor comprising the rotor.

BACKGROUND OF THE INVENTION

Patent Literature 1 (Japanese Unexamined Patent Publication (Kokai) No. 2001-061261) describes "A permanent magnet rotor 1 comprises a columnar stacked rotor yoke 2 and two pairs of plate-shaped field permanent magnets 3 (3a, 3b, 3c, 3d). The rotor yoke 2 is formed by punching a large number of silicon steel plates 4 with a die and stacking them together. The rotor yoke 2 has four magnetic poles 5 (5a, 5b, 5c, 5d) projecting in the radial direction on its outer peripheral surface. The bases of these magnetic poles are provided with slots 6 (6a, 6b, 6c, 6d) into which field permanent magnets are inserted. Further, the rotor yoke 2 is provided with a rotation shaft hole in the center thereof, through which a rotation shaft passes. Further, rivet through holes 13a for affixation of the field permanent magnets in the axial direction are provided between the shortest distance between the slot and the rotation shaft hole."

PATENT LITERATURE

PTL 1: Japanese Unexamined Patent Publication (Kokai) No. 2001-061261

SUMMARY OF THE INVENTION

Rotors are incorporated into motors along with a stator arranged around the rotor. Such motors are installed in industrial machines, such as machine tools. When a motor is subjected to external force or torsional resonance from the machine, more torque than expected may be exerted on the rotor of the motor. Generally, a rotor core is formed by stacking a plurality of magnetic plates. Thus, when the rotor is twisted, the side surfaces of the magnets, which are approximately perpendicular to the circumferential direction of the rotor, come into contact with some of the plurality of magnetic plates and become damaged, and as a result, the torque of the motor may decrease.

Thus, a rotor in which the torque of the motor is not reduced even when the rotor twists, and a motor comprising such a rotor are desired.

According to a first aspect of the present disclosure, there is provided a rotor, comprising a rotor core, a plurality of magnets which are inserted into a plurality of first through holes formed in the rotor core, and a plurality of rods which are inserted into a plurality of second through holes formed in the rotor core, wherein a first cavity between each of the plurality of first through holes and each of the plurality of magnets is larger than a second cavity between each of the plurality of second through holes and each of the plurality of rods.

In the first aspect, since the first cavity of the first through holes, where the magnets are arranged, is larger than the second cavity of the second through holes, where the rods are arranged, the magnets can move within the cavity over a longer distance than the rods. Specifically, there is more margin for the magnets to move within the first cavity than for the rods to move within the second cavity. Thus, when the rotor twists, the rods contact the inner wall of the second through holes earlier than the side surfaces of the magnets, which are perpendicular to the circumferential direction of the rotor, contact the inner wall of the first through hole, and as a result, the rotor will not twist any further. Thus, it is possible to prevent the side surfaces of the magnet from coming into contact with the inner walls of the first through holes and becoming damaged. Thus, even if the rotor twists, the magnets will not be damaged, and as a result, the torque of the motor can be prevented from decreasing.

The objects, features, and advantages of the present invention will become more apparent from the following description of the embodiments in conjunction with the accompanying drawings.

DETAILED DESCRIPTION OF EMBODIMENTS OF THE INVENTION

Figure 1:
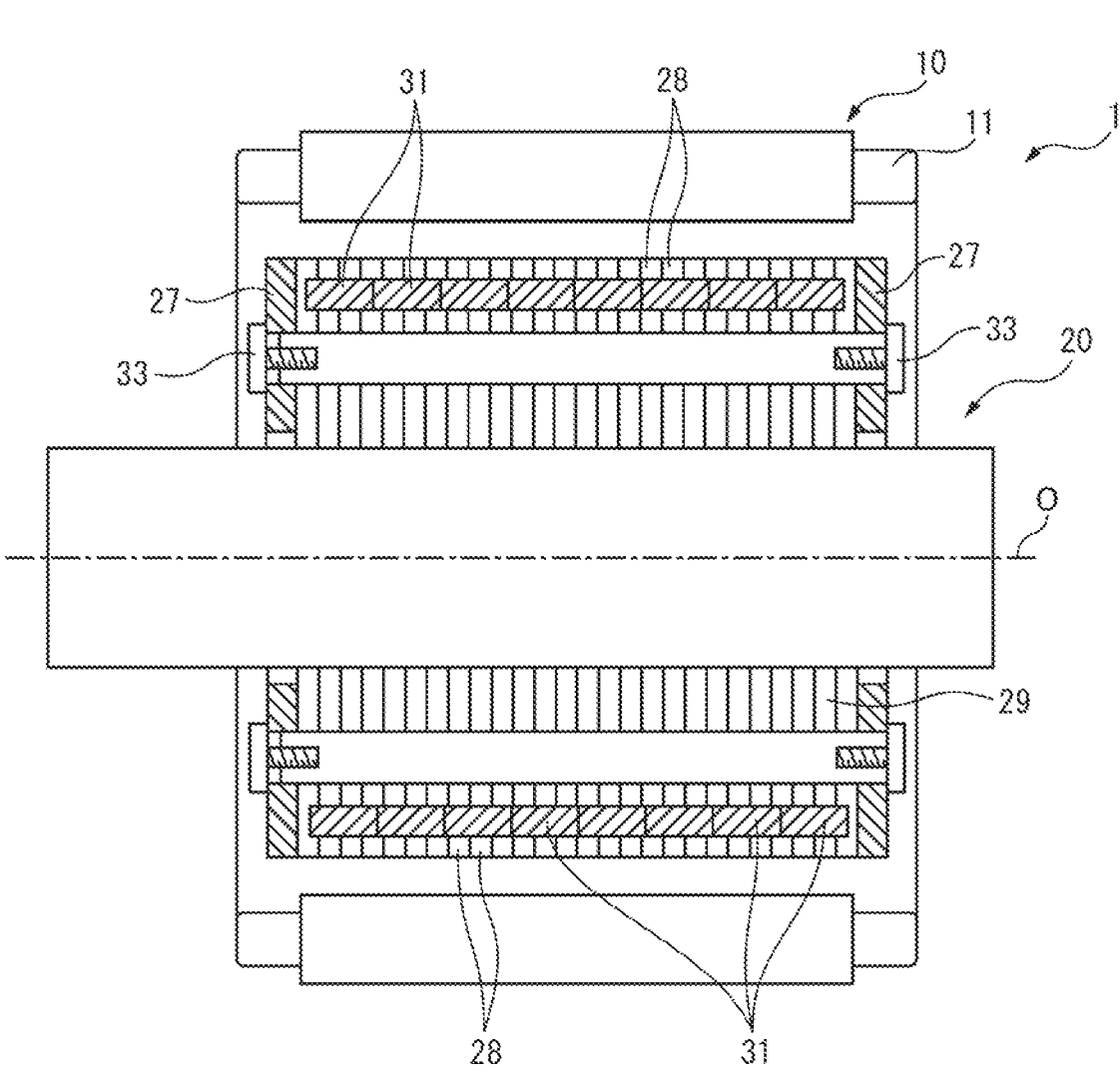
FIG. 1 is an axial cross-sectional view of a motor comprising a rotor according to the present disclosure.

The embodiments of the present invention will be described below with reference to the attached drawings. In the drawings, corresponding constituent elements have been assigned common reference signs.

Figure 2:
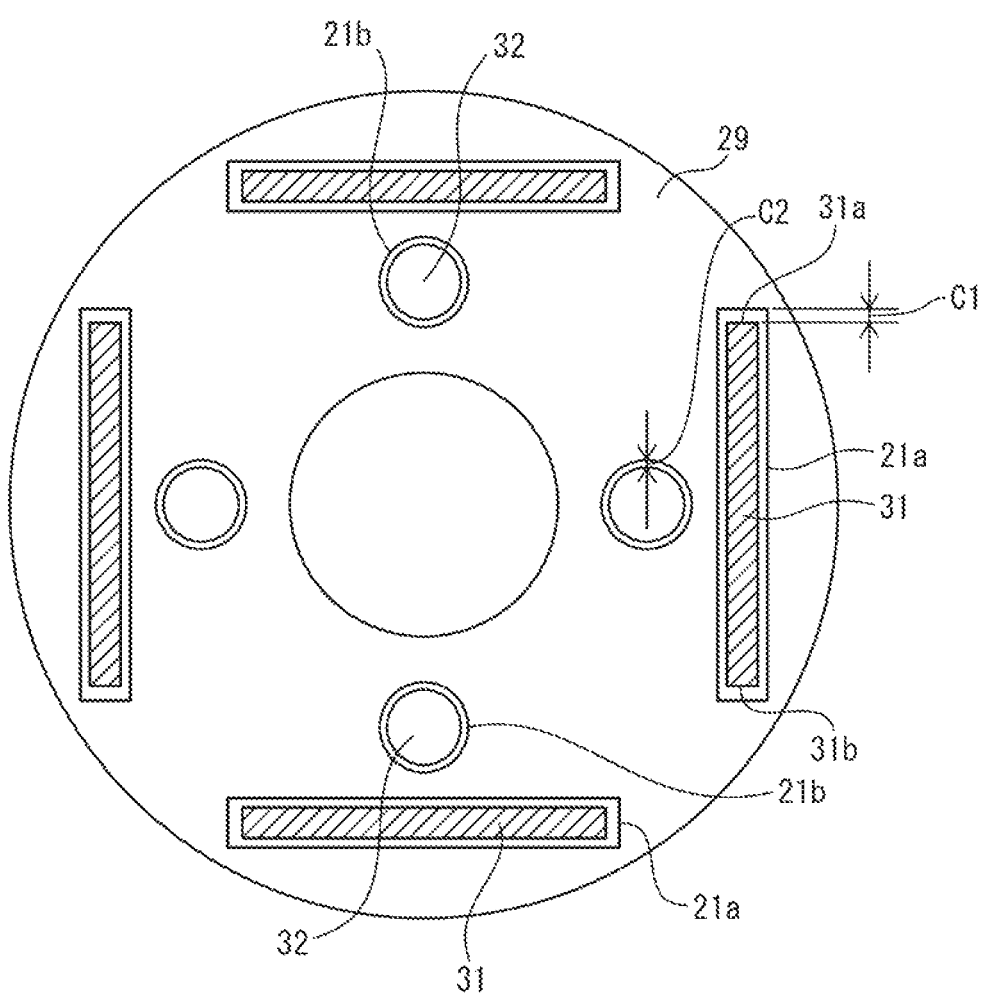
FIG. 2 is a radial cross-sectional view of the rotor of a first embodiment.

FIG. 1 is an axial cross-sectional view of a motor 1 comprising a rotor according to the present disclosure. FIG. 2 is a radial cross-sectional view of the rotor of a first embodiment. The motor 1 shown in FIG. 1 comprises an annular stator 10 and a rotor 20 arranged inside the stator 10. As is well known, a plurality of slots (not illustrated) are formed at equal intervals on the inner peripheral surface of the stator 10, and coils 11 are arranged in these slots.

The rotor 20 has a cylindrical shape having a rotation axis O coaxial with the stator 10, and is supported by a bearing (not illustrated) so as to be rotatable about the rotation axis O. The rotor core 29 of the rotor 20 is formed by stacking a plurality of magnetic plates 28, for example, electromagnetic steel plates. A plurality of first openings and a plurality of second openings are formed in each of the plurality of magnetic plates 28. Thus, when the plurality of magnetic plates 28 are stacked, a plurality of first through holes 21a and a plurality of second through holes 21b extending parallel to the axial direction of the rotor 20 are formed.

As can be understood from FIGS. 1 and 2, one flat permanent magnet or a plurality of flat permanent magnets juxtaposed with each other are inserted into each of the first through holes 21a. Hereinafter, one flat permanent magnet and a plurality of permanent magnets will be simply referred to as magnet(s) 31. A hard rod 32 composed of a magnetic or non-magnetic material is inserted into each of the second through holes 21b.

Both end surfaces of the rotor core 29 are closed by an end plate 27 provided with a plurality of through holes formed at positions corresponding to the second through holes 21b. The ends of the rods 32 are affixed to the end plates 27 using fasteners 33, for example, a bolt alone or a combination of a bolt and a washer. As a result, the rotor core 29, which is composed of a plurality of magnetic plates, can be tightened in the axial direction. For this purpose, recesses having threading for engaging the bolts as fasteners 33 are preferably formed in the ends of the rods 32.

With reference to FIG. 2, the plurality of first through holes 21a are formed at equal intervals in the circumferential direction of the rotor 20. Further, the plurality of second through holes 21b are also formed at equal intervals in the circumferential direction of the rotor 20. The cross sections of the first through holes 21a in the radial direction of the rotor 20 are rectangular, and the cross sections of the second through holes 21b are circular.

In the example shown in FIG. 2, four first through holes 21a are formed at an angle of 90° relative to each other. In the example shown in FIG. 2, the four first through holes 21a are formed more radially outward of the rotor 20 than the four second through holes 21b.

As is well known, the rotor 20 rotates in accordance with a rotating magnetic field formed by a current flowing through the coil 11 of the stator 10.

With reference to FIG. 2, the magnets 31 have side surfaces 31a and 31b which are perpendicular to the circumferential direction of the rotor 20. In other words, the side surfaces 31a and 31b of the magnets 31 are side surfaces adjacent to the side surfaces of the magnets 31 perpendicular to the radial direction of the rotor 20. A first cavity C1 is formed between the side surface 31a and the inner wall of the first through hole 21a facing the side surface 31a. Note that a first cavity C1 having similar dimensions may be formed between the side surface 31b and the inner wall of the first through hole 21a facing the side surface 31b.

Furthermore, the cavity between the side surface of the magnet 31 perpendicular to the radial direction of the rotor 20 and the inner wall of the first through hole 21a is preferably smaller than the first cavity C1. The first cavity C1 is formed as described above between each of the plurality of magnets 31 and each of the plurality of first through holes 21a.

Furthermore, an annular second cavity C2 is formed between the outer peripheral surface of the rod 32 and the inner peripheral surface of the second through hole 21b. The first cavity C1 described above is larger than the second cavity C2.

Note that the second cavity C2 may be formed in a part of the outer peripheral surface of the rod 32 facing in the opposite direction to the rotation direction of the rotor 20. Thus, the second through hole 21b may be an ellipse concentric with the center of the rod 32 or eccentric from the center of the rod 32. Furthermore, as illustrated, the second cavity C2 may be formed between the entire outer peripheral surface of the rod 32 and the entire inner peripheral surface of the second through hole 21b. The second cavity C2 is formed between each of the plurality of rods 32 and each of the plurality of second through holes 21b as described above. Preferably, the dimensions of first cavity C1 and second cavity C2 are greater than zero. As a result, the magnets 31 and the rods 32 can be easily inserted into the first through holes 21a and the second through holes 21b, respectively, whereby the rotor 20 can be easily assembled.

When the motor 1 in which the rotor 20 is disposed within the stator 10, the rotor 20 rotates relative to the stator 10. If an external force or torsional resonance acts on the motor 1 from the machine (not illustrated) in which the motor 1 is installed, a torque greater than expected may be exerted on the rotor 20. As a result, the rotor 20 twists, and the side surface 31a (and/or 31b) of the magnet 31 can move in the circumferential direction of the rotor 20 toward the inner wall of the first through hole 21a, and the rod 32 can move in the circumferential direction of the rotor 20 toward the inner wall of the second through hole 21b.

As described above, the first cavity C1 of the first through holes 21a, where the magnets 31 are arranged, is larger than the second cavity C2 of the second through holes 21b, where the rods 32 are arranged. Thus, the magnets 31 can move over a longer distance than the rods 32. Specifically, there is a larger allowance for the magnets 31 to move within the first cavity C1 than for the rods 32 to move within the second cavity C2.

Therefore, when the rotor 20 twists, the rods 32 contact the inner walls of the second through holes 21b earlier than the side surfaces 31a (and/or 31b) of the magnets 31, which are perpendicular to the circumferential direction of the rotor 20, contact the inner walls of the first through holes 21a, whereby the rotor 20 is prevented from further twisting. Thus, it is possible to prevent the side surfaces 31a (and/or 31b) of the magnets 31 from coming into contact with the inner walls of the first through holes 21a and becoming damaged. Therefore, in the present disclosure, even if the rotor 20 twists, the magnets 31 are not damaged, and thus, the torque of the motor 1 can be prevented from decreasing. Thus, the present disclosure is particularly advantageous for a motor 1 in which the rotor 20 comprises rods 32.

As shown in FIG. 2, when the plurality of magnets 31 are located radially outward from the plurality of rods 32, the magnets 31 tend to move toward the inner walls of the corresponding first through holes 21a when the rotor 20 rotates. In such a case, the first cavity C1 is dimensioned to be larger than the second cavity C2 and larger than the expected movement distance of the magnet 31, thereby similarly preventing damage to the magnet 31. Specifically, the present disclosure is particularly advantageous when the plurality of magnets 31 are located more radially outward than the plurality of rods 32.

Figure 3:
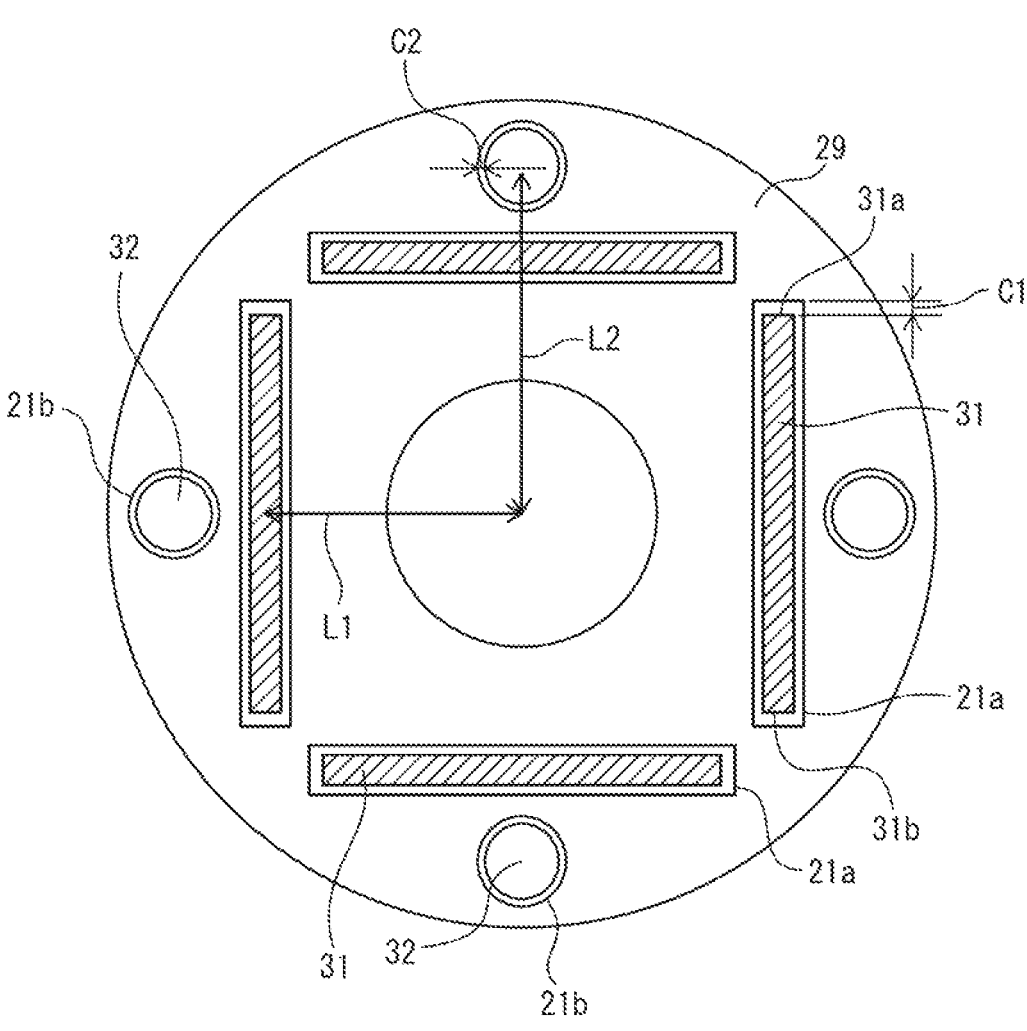
FIG. 3 is a radial cross-sectional view of the rotor of a second embodiment.

FIG. 3 is a radial cross-sectional view of the rotor of a second embodiment. In FIG. 3, the plurality of magnets 31 are located more radially inward than the plurality of rods 32. Even in such a configuration, by forming the first cavity C1 larger than the second cavity C2, substantially the same effect as described above can be obtained. Thus, the configuration shown in FIG. 3 is also included within the scope of the present disclosure.

Considering that the magnets 31 move perpendicularly to the radial direction of the rotor 20, it is preferable that the side surfaces 31a, 31b of the magnets 31 and the inner walls of the first through holes 21a facing them be parallel to each other. In this case, a sufficient distance over which the magnet 31 can move can be secured between the side surfaces 31a, 31b of the magnets 31 and the inner walls of the first through holes 21a. Even if the side surfaces 31a (31b) of the magnets 31 contact the inner walls of the first through holes 21a, the entire of each side surface 31a (31b) of the magnets 31 contacts the inner wall of the first through holes 21a. Specifically, only a portion of the side surface 31a does not come into contact with the inner wall of the first through hole 21a. Thus, the contact force can be prevented from being concentrated on a portion of the side surface 31a (31b) of the magnet 31, and damage to that portion can be avoided.

Figure 4A:
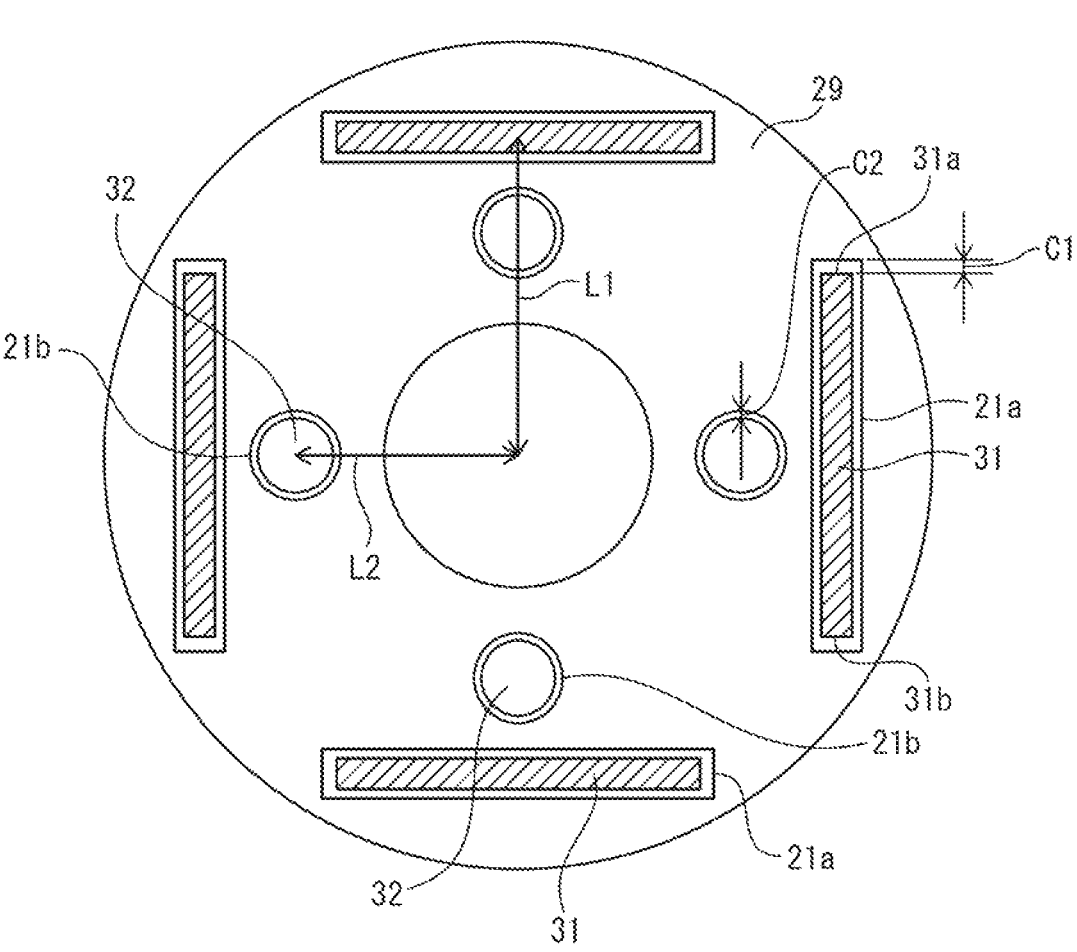
FIG. 4A is a radial cross-sectional view of a rotor of a third embodiment.

FIG. 4A is a radial cross-sectional view of the rotor of a third embodiment. In FIG. 4A, the plurality of magnets 31 are arranged more outward in the radial direction of the rotor 20 than the plurality of rods 32. In FIG. 4A, the distance L1 from the center of the rotor core 29 to the center of the magnet 31 and the distance L2 from the center of the rotor core 29 to the center of the rod 32 are set. Note that the distance L1 is common to each of the plurality of magnets 31, and the distance L2 is common to each of the plurality of rods 32.

In the third embodiment, the ratio R1 of the first cavity C1 to the distance L1 is determined so as to be greater than the ratio R2 of the second cavity C2 to the distance L2. When the rotor 20 twists, the greater the radial distance from the center of the rotor 20, the greater the distance traveled in the circumferential direction. By setting the ratios R1 and R2 as described above, the first through holes 21a and second through holes 21b, which can form the first cavity C1 and second cavity C2, can be easily set, whereby damage to the magnet 31 can be reliably prevented.

In other words, the positional relationship between the plurality of magnets 31 and the plurality of rods 32 is not limited as long as the ratio R1 of the first cavity C1 to the distance L1 is greater than the ratio R2 of the second cavity C2 to the distance L2, and as shown in FIG. 3, the plurality of magnets 31 can be arranged more inward in the radial direction of the rotor 20 than the plurality of rods 32.

In FIG. 2 and the like, each of the centers of the plurality of magnets 31 and each of the centers of the plurality of rods 32 are located on the same radius of the rotor 20. However, as shown in FIG. 4B, which is a radial cross-sectional view of the rotor in another embodiment, each of the centers of the plurality of magnets 31 and each of the centers of the plurality of rods 32 may be located on different radii of the rotor 20.

Figure 4B:
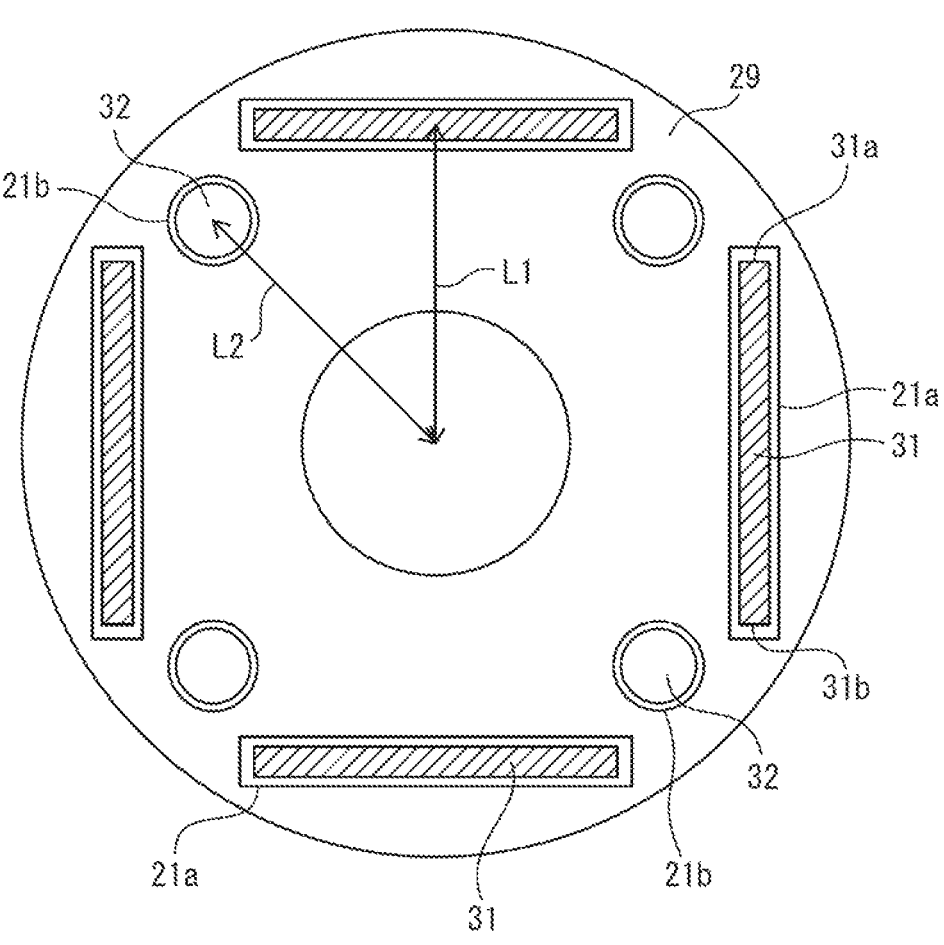
FIG. 4B is a radial cross-sectional view of a rotor of another embodiment.

In the configurations shown in FIGS. 4B and 3, in the case in which the ratio R1 of the first cavity C1 to the distance L1 is greater than the ratio R2 of the second cavity C2 to the distance L2, the same effects as described above can be obtained, and this case is included in the scope of the present disclosure. Note that the same applies when the first cavity C1 is larger than the second cavity C2 in the configurations shown in FIGS. 4B and 3.

Figure 5:
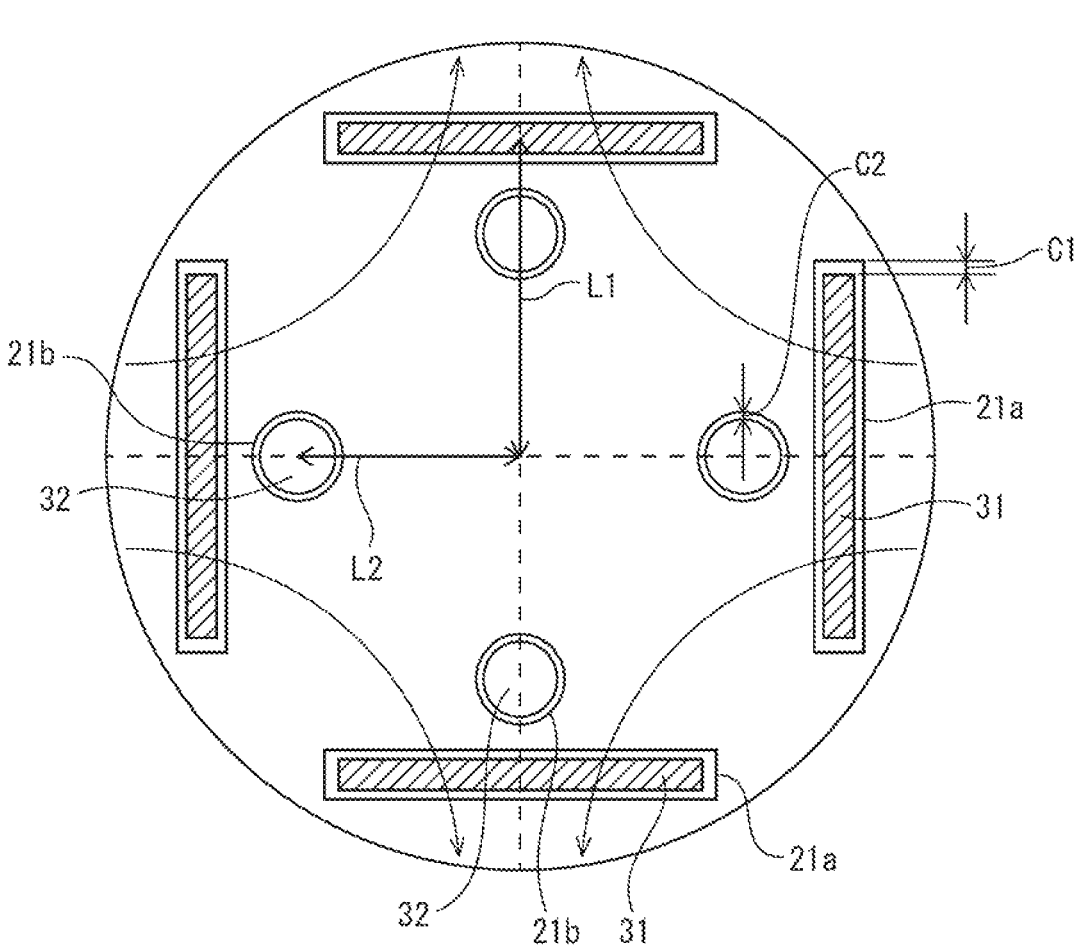
FIG. 5 is a radial cross-sectional view of the rotor of a fourth embodiment.

FIG. 5 is a radial cross-sectional view of the rotor of a fourth embodiment. In FIG. 5, each of the plurality of magnets 31 and each of the plurality of rods 32 located at positions corresponding to the plurality of magnets 31 are in the same phase. The distance L1 from the center of the rotor core 29 to the center of the magnet 31 is greater than the distance L2 from the center of the rotor core 29 to the center of the rod 32. In such a case, as shown by the curve in FIG. 5, the magnetic flux does not pass over the rod 32. Thus, a motor 1 with which magnetic saturation can be suppressed can be provided.

Figure 6:
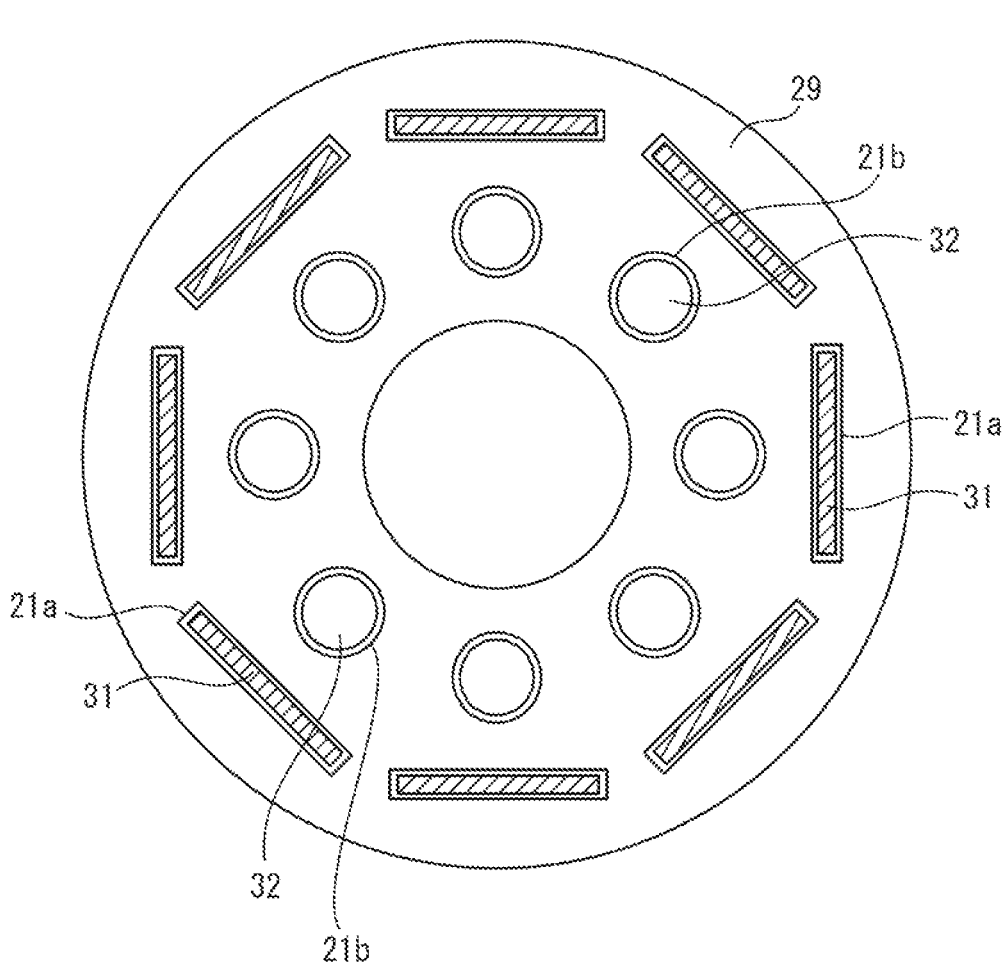
FIG. 6 is a radial cross-sectional view of the rotor of a fifth embodiment.

FIG. 6 is a radial cross-sectional view of the rotor of a fifth embodiment. In FIG. 6, eight first through holes 21a and eight second through holes 21b are formed at equal intervals in the circumferential direction of the rotor 20. Magnets 31 and rods 32 are inserted into the first through holes 21a and the second through holes 21b, respectively. In this case as well, the first cavity C1 and second cavity C2 (both not illustrated) are formed as described above, and thus, the same effects as described above can be obtained.

However, the first cavity C1 and the second cavity C2 in the fifth embodiment are smaller than the first cavity C1 and the second cavity C2 shown in FIG. 2, respectively. In this manner, even a configuration including eight magnets 31 and eight rods 32 is included in the scope of the present disclosure. Note that even numbers of magnets 31 and rods 32 other than 4 and 8 are within the scope of the present disclosure as long as they satisfy the above-described relationship between the first cavity C1 and the second cavity C2 and/or the above-described relationship between the ratio R1 and the ratio R2. Similarly, the number of magnets 31 and the number of rods 32 may be different from each other as long as the above-described relationship between the first cavity C1 and the second cavity C2 and/or the above-described relationship between the ratio R1 and the ratio R2 is satisfied.

Figure 7:
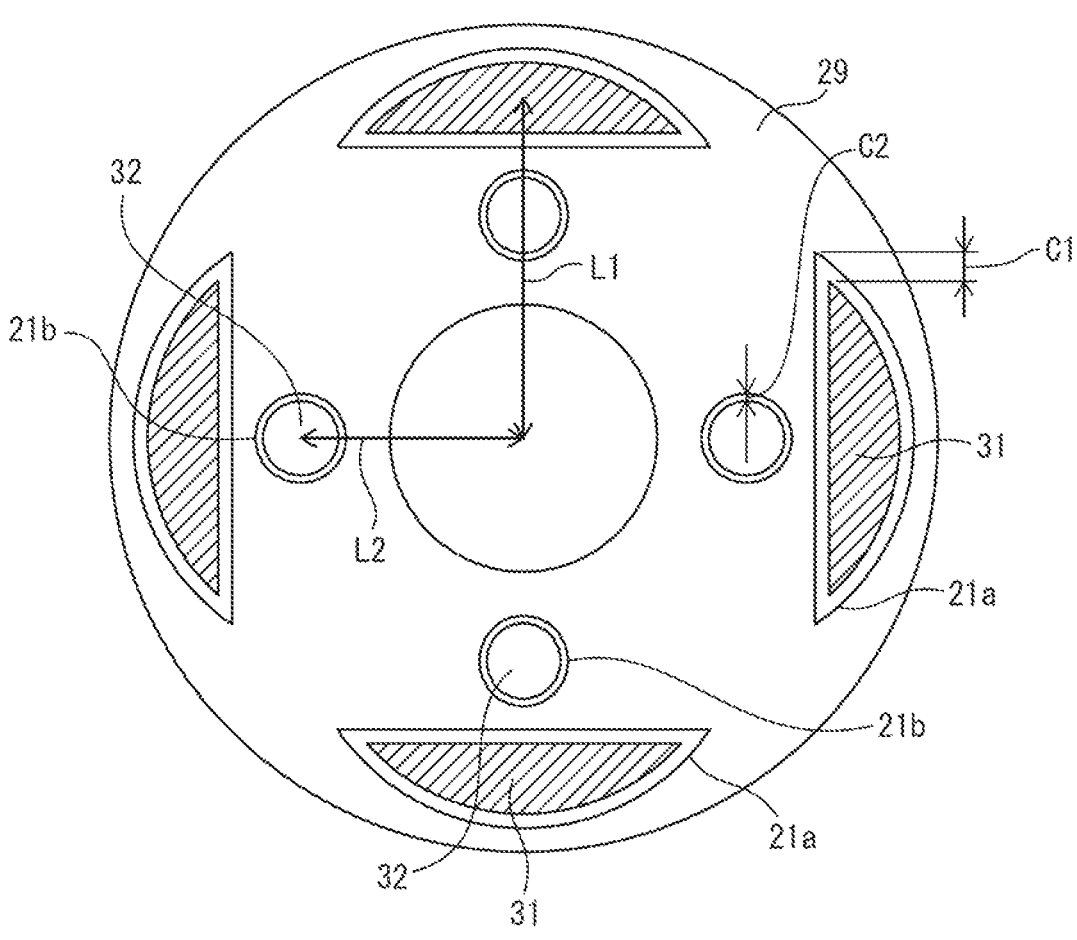
FIG. 7 is a radial cross-sectional view of the rotor of a sixth embodiment.

FIG. 7 is a radial cross-sectional view of the rotor of a sixth embodiment. In the sixth embodiment, the cross sections of the magnets 31 in the radial direction of the rotor 20 are not rectangular. In the example shown in FIG. 7, the side surfaces of the magnet 31 located far from the center of the rotor 20 are curved outward. The cross sections of the magnets 31 in the radial direction of the rotor 20 may be a part of a circle surrounded by a chord and an arc. In this manner, the cross sections of the magnets 31 in the radial direction of the rotor 20 may be different as long as the above-described relationship between the first cavity C1 and the second cavity C2 and/or the above-described relationship between the ratio R1 and the ratio R2 are satisfied.

In the embodiment shown in FIG. 7, it is preferable that the side surfaces of the magnets 31 perpendicular to the circumferential direction of the rotor 20 and the inner walls of the first through holes 21a facing the side surfaces be parallel to each other. The reason is that when the rotor 20 twists and the magnets 31 move in the circumferential direction, the entire side surface of each magnet 31 is brought into contact with the inner wall of the first through hole 21a. This makes it possible to secure a margin for the side surfaces of the magnets 31 to move.

Conversely, if the side surfaces of the magnets 31 perpendicular to the circumferential direction of the rotor 20 and the inner walls of the first through holes 21a facing the side surfaces are not parallel to each other, when the magnets 31 move in the circumferential direction, a portion of the side surface of each magnet 31 may come into contact with the inner wall of the first through hole 21a before the other portion. As a result, the above-mentioned portion of the side surface of the magnet 31 may become damaged. In the present disclosure, it is possible to avoid such a situation.

Note that the motor 1 including the rotor 20 according to any of the embodiments described above is also included in the scope of the present disclosure.

Description of Aspects

According to a first aspect, there is provided a rotor 20, comprising a rotor core (29), a plurality of magnets (31) which are inserted into a plurality of first through holes (21a) formed in the rotor core, and a plurality of rods (32) which are inserted into a plurality of second through holes (21b) formed in the rotor core, wherein a first cavity (C1) between each of the plurality of first through holes and each of the plurality of magnets is larger than a second cavity (C2) between each of the plurality of second through holes and each of the plurality of rods.

According to a second aspect, in the first aspect, the first cavity is a cavity formed in the circumferential direction of the rotor core, the second cavity is a cavity formed in the circumferential direction of the rotor core, and a ratio (R1) of the first cavity to a distance (L1) from a center of the rotor core to each of the plurality of magnets is greater than a ratio (R2) of the second cavity to a distance (L2) from the center of the rotor core to each of the plurality of rods.

According to a third aspect, in the first or second aspect, each of the first cavity and the second cavity is greater than zero.

According to a fourth aspect, in the first aspect, when each of the plurality of magnets and each of the plurality of rods located at a position corresponding to each of the plurality of magnets are in the same phase, the distance from the center of the rotor core to each of the plurality of magnets is greater than the distance from the center of the rotor core to each of the plurality of rods.

According to a fifth aspect, there is provided a motor comprising the rotor according to any one of the first through fourth aspects and a stator (10) arranged around the rotor (1).

Effects of Aspects

In the first and fifth aspects, when the rotor twists, the rods contact the inner walls of the second through holes earlier than the side surfaces of the magnets, which are perpendicular to the axial direction of the rotor, contact the inner walls of the first through holes, and as a result, the rotor will not twist any further. Thus, it is possible to prevent the side surfaces of the magnets from coming into contact with the inner walls of the first through holes and becoming damaged. Thus, even if the rotor twists, the magnets will not be damaged, and as a result, the torque of the motor can be prevented from decreasing.

In the second aspect, damage to the magnet can be reliably prevented.

In the third aspect, the magnets and the rods can easily be inserted into the first through holes and the second through holes, respectively, whereby the rotor can easily be assembled.

In the fourth aspect, a motor with which magnetic saturation can be suppressed can be provided.

Though the embodiments of the present invention have been described, a person skilled in the art would understand that various modifications and changes can be made without deviating from the scope disclosed in the claims, which are described later.

REFERENCE SIGNS LIST 1 motor
10 stator 20 rotor
21a first through hole
21b second through hole
27 end plate
28 magnetic plate
29 rotor core
31 magnet
31a, 31b side surface
32 rod
33 fastener
C1 first cavity
C2 second cavity

The invention claimed is:

1. A rotor, comprising:
a rotor core,
a plurality of magnets which are inserted into a plurality of first through holes formed in the rotor core, and
a plurality of rods which are inserted into a plurality of second through holes formed in the rotor core, wherein
a first cavity between an inner wall of each of the plurality of first through holes and each of the plurality of magnets is larger than a second cavity between an inner wall of each of the plurality of second through holes and each of the plurality of rods, and wherein
the first cavity is a portion of the first through hole,
the second cavity is a portion of the second through hole,
any side surface of the plurality of magnets, which is perpendicular to a circumferential direction of the rotor core, is parallel and movable to any inner wall of the plurality of first through holes, which faces the side surface of the plurality of magnets.

2. The rotor according to claim 1, wherein the first cavity is a cavity formed in the circumferential direction of the rotor core,
the second cavity is a cavity formed in the circumferential direction of the rotor core, and
a ratio of the first cavity to a distance from a center of the rotor core to each of the plurality of magnets is greater than a ratio of the second cavity to a distance from the center of the rotor core to each of the plurality of rods.

3. The rotor according to claim 1, wherein each of the first cavity and the second cavity is greater than zero.

4. The rotor according to claim 1, wherein when each of the plurality of magnets and each of the plurality of rods located at a position corresponding to each of the plurality of magnets are in a same phase, a distance from the center of the rotor core to each of the plurality of magnets is greater than the distance from the center of the rotor core to each of the plurality of rods.

5. A motor comprising the rotor according to claim 1 and a stator arranged around the rotor.

* * * * *